(12) United States Patent
Ruan et al.

(10) Patent No.: US 8,805,087 B2
(45) Date of Patent: Aug. 12, 2014

(54) IMAGE PROCESSING DEVICE AND IMAGE PROCESSING METHOD

(75) Inventors: Xiang Ruan, Otsu (JP); Takayoshi Yamashita, Kizugawa (JP)

(73) Assignee: OMRON Corporation, Kyoto-Shi (JP)

( * ) Notice: Subject to any disclaimer, the term of this patent is extended or adjusted under 35 U.S.C. 154(b) by 0 days.

(21) Appl. No.: 13/982,654

(22) PCT Filed: Mar. 22, 2011

(86) PCT No.: PCT/JP2011/056782
§ 371 (c)(1),
(2), (4) Date: Nov. 7, 2013

(87) PCT Pub. No.: WO2012/124146
PCT Pub. Date: Sep. 20, 2012

(65) Prior Publication Data
US 2014/0056529 A1    Feb. 27, 2014

(30) Foreign Application Priority Data
Mar. 11, 2011    (JP) .................................. 2011-054651

(51) Int. Cl.
G06K 9/48    (2006.01)
G06K 9/00    (2006.01)
G06T 7/60    (2006.01)
G06K 9/46    (2006.01)

(52) U.S. Cl.
CPC .............. *G06K 9/00268* (2013.01); *G06T 7/60* (2013.01); *G06K 9/00597* (2013.01); *G06K 9/0061* (2013.01); *G06K 9/4633* (2013.01)
USPC ........... 382/199; 382/128; 382/190; 382/117; 382/173; 382/281

(58) Field of Classification Search
USPC .......................... 382/128, 190, 117, 173, 281
See application file for complete search history.

(56) References Cited

U.S. PATENT DOCUMENTS

| | | | |
|---|---|---|---|
| 2008/0012860 A1* | 1/2008 | Klefenz et al. | 345/441 |
| 2008/0170760 A1* | 7/2008 | Monro | 382/117 |
| 2010/0189357 A1* | 7/2010 | Robin et al. | 382/195 |

FOREIGN PATENT DOCUMENTS

| | | |
|---|---|---|
| JP | 2005-309862 A | 11/2005 |
| JP | 2009-181424 A | 8/2009 |
| JP | 2010-009234 A | 1/2010 |

OTHER PUBLICATIONS

A novel eyelid detection—segmentation, Wang et al., SPIE, vol. 6833M, 2007, pp. 1-8.*
International Search Report for Application No. PCT/JP2011/056782, issued May 24, 2011.

* cited by examiner

*Primary Examiner* — Jayesh A Patel
(74) *Attorney, Agent, or Firm* — Nutter McClennen & Fish LLP; John J. Penny, Jr.; Michael P. Visconti, III

(57) ABSTRACT

An image processing device for identifying a characteristic of an eye from a face image comprising: a first differentiation unit configured to differentiate an eye region in at least a vertical direction of the eye to obtain a first luminance gradient; a first edge extraction unit configured to extract a first edge point according to the first luminance gradient; and a curve identification unit configured to identify a curve, which is a B-spline curve or a Bezier curve expressed by a control point and both end points and fits to the first edge point, as a curve expressing an upper-eyelid or lower-eyelid outline, the end points being an inner corner point of eye and a tail point of eye, by voting for the control point that is a voting target with respect to the first edge point using the Hough transform.

9 Claims, 6 Drawing Sheets

(a)

| -1 | 0 | 1 |
|----|---|---|
| -2 | 0 | 2 |
| -1 | 0 | 1 |

(b)

| 1  | 2  | 1  |
|----|----|----|
| 0  | 0  | 0  |
| -1 | -2 | -1 |

IMAGE PROCESSING DEVICE AND IMAGE PROCESSING METHOD

CROSS-REFERENCE TO RELATED APPLICATION(S)

This application claims the benefit of priority from Japanese Patent Application No. 2011-054651, filed on 11 Mar. 2011, and International Application No. PCT/JP2011/056782, filed on 22 Mar. 2011 and designating the United States, the entire contents of which is incorporated herein by reference for all purposes.

BACKGROUND

The present invention relates to an image processing device and an image processing method, particularly to an image processing device and an image processing method for identifying a pupil region.

Recently, there is developed a technology of automatically correcting a face image of a person captured by a digital camera or a camera-equipped mobile phone. In the face of the person, particularly an eye attracts attention of an observer of the image. As to correction performed to the eye, for example, it is conceivable to correct a red eye caused by a flash. There is also a technology of changing (improving) an appearance by enlarging the eye or a pupil in the face image. In the case that the eye or the pupil is corrected, a pupil region of the eye is accurately detected.

For example, a technology described in Patent Document 1 (Japanese Unexamined Patent Publication No. 2009-181424) is well known as a method for detecting a position of the pupil. In a configuration described in Patent Document 1, a circular pupil is detected using a Hough transform. At this point, using a difference in density gradient between the eye captured under near-infrared illumination and the eye captured under visible-light illumination, a fan-like voting region is set to control generation of a pseudo voting value peak.

CITATION LIST

However, in the conventional configuration, unfortunately the pupil region cannot accurately be detected.

Usually, in the case that the circle is detected by the Hough transform, an edge (an outline) of luminance is extracted from an image as preprocessing, and the circle is detected by voting for the edge by the Hough transform. However, edges (such as upper-eyelid and lower-eyelid outlines, an eyelash, a wrinkle, make-up such as an eyeliner, and an edge by a shadow) except the pupil are detected as a noise from an image of a surrounding region including the eye used in image processing. Particularly, the edges of the upper eyelid and the lower eyelid are long, and the edges extend over many pixels. Because the edges of the upper eyelid and the lower eyelid are frequently close to a circular shape or an elliptic shape, the number of votes for the circle fitting to the upper eyelid or the lower eyelid increases, and there is a possibility of falsely detecting the position of the circle indicating the upper eyelid or the lower eyelid as the position of the pupil.

In the face image, the entire pupil outline is rarely seen. Particularly, in the case that a person has narrowed eyes, frequently the upper and lower outlines of the pupil are hidden behind the upper eyelid and the lower eyelid. In the conventional configuration, because the number of votes by the edge of the pupil decreases, the position of the circle indicating the upper eyelid or the lower eyelid is easily falsely detected as the position of the pupil.

As described above, frequently part of the pupil region is hidden behind the upper eyelid and the lower eyelid. Therefore, in order to accurately detect the pupil region from the face image, not only the pupil outline as the circle is detected, but also boundary lines (boundary lines between the eye and a skin) of the upper eyelid and the lower eyelid are accurately detected. However, in the conventional configuration, the shapes of the upper eyelid and the lower eyelid are not considered, and the pupil region cannot accurately be detected.

Conventionally, the eyelid outline (the eye outline) is mainly approximated by quadratic curves (conic curves), such as the ellipse and a parabola. However, sometimes the eyelid outline cannot accurately be expressed by the quadratic curves. For example, the shape of the eyelid outline depends largely on individual differences, and frequently the eyelid outline cannot be expressed by the ellipse or the parabola. The eyelid outline becomes the shape that cannot accurately be expressed by the ellipse or the parabola depending on an orientation of the face captured in the image, particularly in the case that the face is not oriented toward the front. Unless the eyelid outline can accurately be detected, the pupil region cannot be identified with high accuracy.

The present invention has been devised to solve the problems described above, and an object thereof is to construct an image processing device that can accurately detect the pupil region.

SUMMARY

In accordance with one aspect of at least one embodiment of the present invention, an image processing device for identifying a characteristic of an eye from a face image of a person, the image processing device includes: a first differentiation unit configured to differentiate an eye region where the eye of the face image exists in at least a vertical direction of the eye to obtain a first luminance gradient; a first edge extraction unit configured to extract a first edge point in the eye region according to the first luminance gradient; and a curve identification unit configured to identify a curve, which is expressed by a control point and both end points and fits to the first edge point, as a curve expressing an upper-eyelid or lower-eyelid outline, the end points being an inner corner point of eye and a tail point of eye, wherein the curve expressed by both the end points and the control point is a B-spline curve or a Bezier curve, wherein the curve identification unit is configured to vote for the control point that is a voting target with respect to the first edge point using the Hough transform, and identify the B-spline curve or the Bezier curve expressed by both the end points and at least one of the control point, which fits to the first edge point, as the curve expressing the upper-eyelid or lower-eyelid outline based on the voting result.

BRIEF DESCRIPTION OF THE DRAWINGS

FIG. 3(a) is a view illustrating a Sobel filter in an x-direction, and FIG. 3(b) is a view illustrating a Sobel filter in a y-direction.

MODES FOR CARRYING OUT THE INVENTION

Hereinafter, an image processing device that is incorporated in a digital camera to perform processing to a face image included in a captured image is mainly described. However, the present invention is not limited to the image processing device incorporated in the digital camera. For example, the image processing device of at least one embodiment of the present invention may be incorporated in photographing devices, such as a digital video camera, a camera-equipped mobile phone, a Web camera of a personal computer (PC), and a photographing seal producing machine, to perform the processing to the images obtained by the photographing devices. The image processing device of at least one embodiment of the present invention may perform the processing to the image acquired through a communication route such as a network or from an external storage device. The processing may be performed not only to the captured still image but also to a face image of a moving image and the like. In capturing the image with the digital camera, the processing may be performed to a preview image displayed on a display device of the digital camera.

[First Embodiment]

A first embodiment of the present invention will be described below with reference to the drawings.

<Configuration of Digital Camera>

Figure 1:
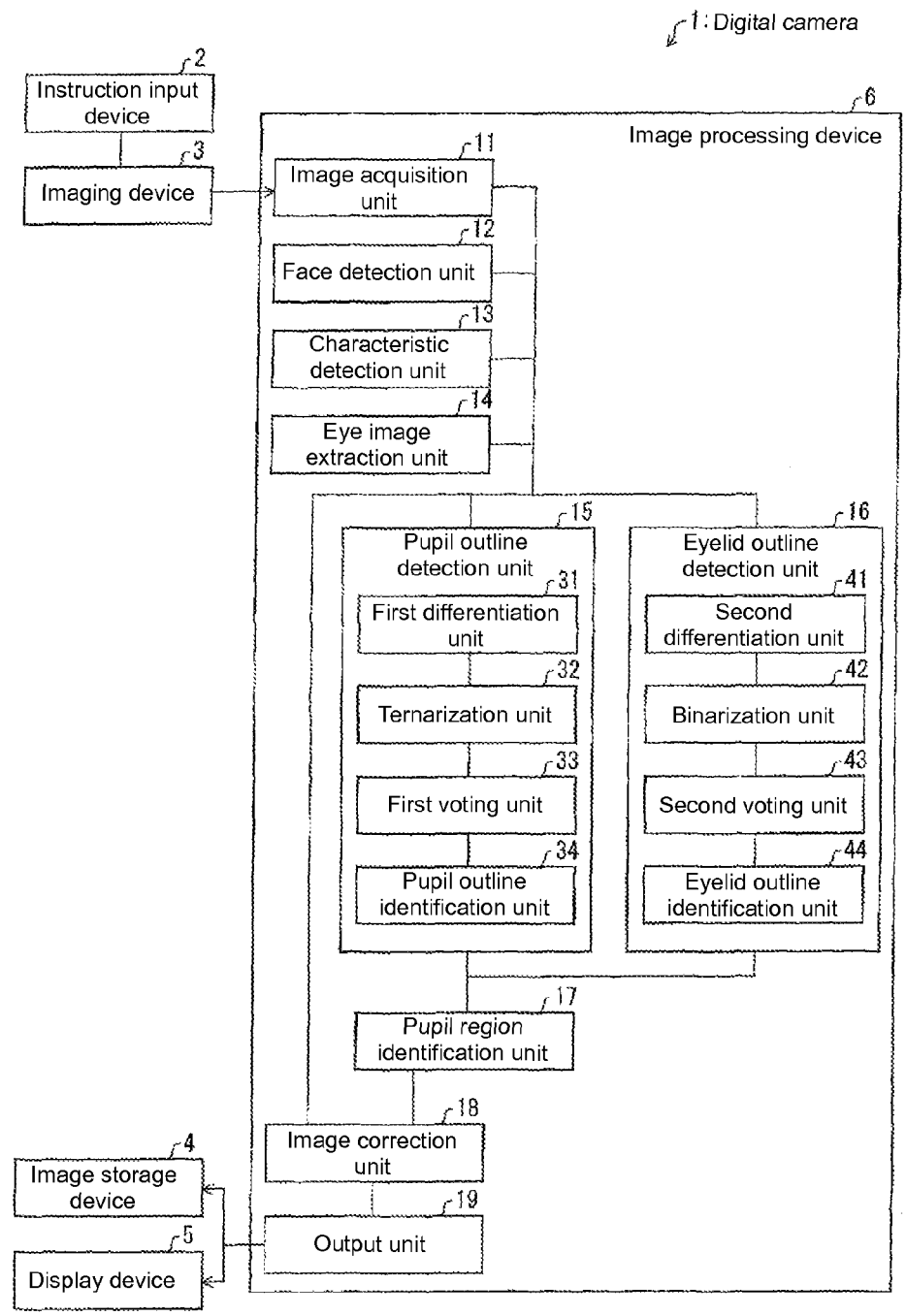
FIG. 1 is a block diagram illustrating a schematic configuration of a digital camera according to an embodiment of the present invention.

FIG. 1 is a block diagram illustrating a schematic configuration of a digital camera 1 according to an embodiment of the present invention. The digital camera 1 includes an instruction input device 2, an imaging device 3, an image storage device 4, a display device 5, and an image processing device 6.

The instruction input device 2 includes an input device such as a button, a key, and a touch panel. The instruction input device 2 receives an image capturing instruction from a user, and outputs the image capturing instruction to the imaging device 3.

The imaging device 3 includes an imaging element such as a CCD (Charge Coupled Device) and a CMOS (Complementary Metal Oxide Semiconductor) imaging element. The imaging device 3 captures an image in response to the image capturing instruction, and outputs the captured image (image data) to the image processing device 6.

Various pieces of information are stored in the image storage device 4, and the image storage device 4 includes a storage device such as an HDD (Hard Disk Drive) or a flash memory. The image storage device 4 receives the image from the image processing device 6, and stores the image therein.

The display device 5 includes a display, and displays the input image to present the image to a user. The display device 5 receives the already-corrected image from the image processing device 6, and displays the image.

<Configuration of Image Processing Device>

The image processing device 6 includes an image acquisition unit 11, a face detection unit 12, a characteristic detection unit 13, an eye image extraction unit 14, a pupil outline detection unit 15, an eyelid outline detection unit 16, a pupil region identification unit 17, an image correction unit 18, and an output unit 19.

The image acquisition unit 11 acquires the captured image as the processing target image from the imaging device 3. The image acquisition unit 11 may acquire the image stored in the image storage device 4 as the processing target image. The image acquisition unit 11 outputs the acquired processing target image to the face detection unit 12, the characteristic detection unit 13, the eye image extraction unit 14, and the image correction unit 18.

The face detection unit 12 detects a face image that is included in the image received from the image acquisition unit 11. The face detection unit 12 identifies a face image position when detecting the face image included in the image. A coordinate at a predetermined point of the face image or a face image region may be indicated as the position of the face image. The face detection unit 12 outputs the face image position to the characteristic detection unit 13 and the eye image extraction unit 14. The face detection unit 12 may detect a plurality of face images from the processing target image. In the case that the plurality of face images are detected, the face detection unit 12 may identify each face image position and output the face image position to each unit.

The characteristic detection unit 13 detects the position of each characteristic of a face of the face image from the processing target image received from the image acquisition unit 11 and the face image position received from the face detection unit 12. Specifically, the characteristic detection unit 13 detects a characteristic of face parts such as an eye (such as an inner corner of eye and a tail of eye), a mouth (such as an end point of the mouth and a center point of the mouth), and a nose (such as a vertex of the nose) and a characteristic (a characteristic point) such as a face outline, and identifies positions of the characteristics. Each characteristic can be detected by a well-known technology. Particularly, the characteristic detection unit 13 detects the inner corner of eye and the tail of eye, and identifies the coordinates of the inner corner of eye and the tail of eye. The characteristic detection unit 13 outputs the position of the detected face characteristic to the eye image extraction unit 14, the pupil outline detection unit 15, and the eyelid outline detection unit 16. The characteristic detection unit 13 may identify the positions of the plurality of face image characteristics and output the positions of the plural face image characteristics to each unit.

Figure 2:
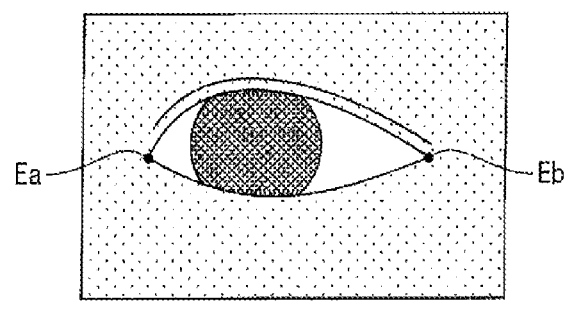
FIG. 2 is a view illustrating an example of an eye image.
Figure 2:
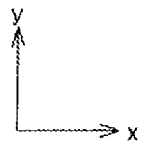

The eye image extraction unit 14 receives the processing target image, the face image position, and the position of the face characteristic from the image acquisition unit 11, the face detection unit 12, and the characteristic detection unit 13, respectively. Based on the received pieces of information, the eye image extraction unit 14 extracts the image in a predetermined region including the eye of the processing target face image. Sometimes the face is inclined in the image. In order to facilitate pupil region detecting processing, the eye image extraction unit 14 generates an image, in which the image of the region including the extracted eye is rotated as needed basis such that a positional relationship between a characteristic point (a tail point of eye) of the tail of the eye and a characteristic point (an inner corner point of eye) of the inner corner of the eye becomes horizontal, as an eye image. It is assumed that an x-direction is a horizontal direction (a direction in which the inner corner of eye and the tail of eye are lined) in the eye image, and that a y-direction is a vertical direction perpendicular to the x-direction. In the first embodiment, because the pupil region detecting processing is performed using luminance information, the eye image extraction unit 14 generates the gray-scaled eye image in which each pixel has only a luminance value. FIG. 2 is a view illustrating an example of the eye image. At this point, it is assumed that the eye image is the image of the eye region including an inner corner point of eye Ea and a tail point of eye Eb. The eye image may include a pupil and surroundings thereof in order to identify the pupil region. The eye image extraction unit 14 outputs the eye image to the pupil outline detection unit 15 and the eyelid outline detection unit 16. The eye image extraction unit 14 outputs information indicating a correspondence relationship between the coordinates of the face image and eye image to the image correction unit 18.

The eye image extraction unit 14 generates the eye image with respect to each of the right and left eyes included in the face, and the pupil outline detection unit 15 and the eyelid outline detection unit 16 process each eye image. Hereinafter, the processing performed to one (left) eye image of one face is described for the sake of convenience. The same processing is also performed to the right eye image.

The pupil outline detection unit 15 acquires the eye image from the eye image extraction unit 14, and acquires the coordinates of the inner corner point of eye Ea and the tail point of eye Eb from the characteristic detection unit 13. The pupil outline detection unit 15 detects a pupil outline as a circle, and outputs information (a center coordinate and a radius) on the detected circle to the pupil region identification unit 17. A detailed structure of the pupil outline detection unit 15 is described later.

The eyelid outline detection unit 16 acquires the eye image from the eye image extraction unit 14, and acquires the coordinates of the inner corner point of eye Ea and the tail point of eye Eb from the characteristic detection unit 13. The eyelid outline detection unit 16 detects an eyelid outline as a curve, and outputs information (coordinates of an end point and a control point) expressing the detected curve to the pupil region identification unit 17. A detailed configuration of the eyelid outline detection unit 16 is described later.

The pupil region identification unit 17 identifies the pupil region in the eye image based on the circle expressing the pupil outline identified by the pupil outline detection unit 15, a curve expressing an upper-eyelid outline identified by the eyelid outline detection unit 16, and a curve expressing a lower-eyelid outline identified by the eyelid outline detection unit 16. Specifically, the pupil region identification unit 17 identifies the region, which is located in the circle expressing the pupil outline and surrounded by the curve expressing the upper-eyelid outline and the curve expressing the lower-eyelid outline, as the pupil region. The pupil region identification unit 17 outputs the identified pupil region to the image correction unit 18.

Based on the pupil region identified by the pupil region identification unit 17, the image correction unit 18 corrects the image of the corresponding eye region in the face image. At this point, a pupil color of the pupil region is corrected. Another piece of correction processing such that a size of the pupil is enlarged based on the eyelid outline may be performed. The image correction unit 18 outputs the corrected image to the output unit 19.

The output unit 19 outputs and stores the corrected image to and in the image storage device 4. The output unit 19 also outputs the corrected image to the display device 5, and controls the display device 5 such that the corrected image is displayed on the display.

<Configuration of Pupil Outline Detection Unit>

The pupil outline detection unit 15 acquires the eye image from the eye image extraction unit 14, and acquires the coordinates of the inner corner point of eye Ea and the tail point of eye Eb from the characteristic detection unit 13. The coordinates of the inner corner point of eye Ea and the tail point of eye Eb are correlated with the eye image. The pupil outline detection unit 15 includes a first differentiation unit (differentiation unit) 31, a ternarization unit (second edge extraction unit) 32, a first voting unit (voting unit) 33, and a pupil outline identification unit 34.

The first differentiation unit 31 applies a differentiation filter to the eye image to detect a luminance gradient in the horizontal direction.

Specifically, the first differentiation unit 31 applies the differentiation filter (in this case a Sobel filter) to the eye image in the x-direction, and obtains the luminance gradient in the horizontal direction. FIG. 3(a) is a view illustrating the Sobel filter in the x-direction. The eye image or the Sobel filter may be applied while scaled as appropriate. When the Sobel filter in FIG. 3(a) is applied to the eye image, a value (a differential value) corresponding to a notable pixel (a pixel located in the center of the filter) having a large luminance difference (the luminance gradient) from a surrounding pixel becomes negative at a place of the eye image in which the luminance decreases from the left toward the right. The differential value becomes positive at the place of the eye image in which the luminance increases from the left toward the right. An absolute value of the differential value increases with increasing luminance gradient. The differential value becomes zero at the place of the eye image in which the luminance does not change from the left toward the right. It can be said that the absolute value of the differential value is an edge intensity.

The ternarization unit 32 acquires the luminance gradient (the differential value) corresponding to each position of the eye image from the first differentiation unit 31, ternarizes the luminance gradient of the eye image to extract an edge point, and generates a first edge image.

Specifically, the ternarization unit 32 ternarizes a differential value dx, which is obtained by applying the horizontal Sobel filter, by a positive threshold ta and a negative threshold tb. Each position of the eye image is $-1$ for $dx \leq tb$, is 0 for $tb < dx < ta$, and is 1 for $ta \leq dx$. At this point, $|tb|=ta$. The value of the first edge image is one of $-1$, 0, and 1, and the place having the ternarized value of $-1$ is the place (the edge point) at which the luminance on the left side is larger than the luminance on the right side. The place having the ternarized value of 1 is the place (the edge point) at which the luminance on the left side is smaller than the luminance on the right side. The place having the ternarized value of 0 is the place at which there is a small difference between the luminance on the left side and the luminance on the right side.

Figures 3, 4:
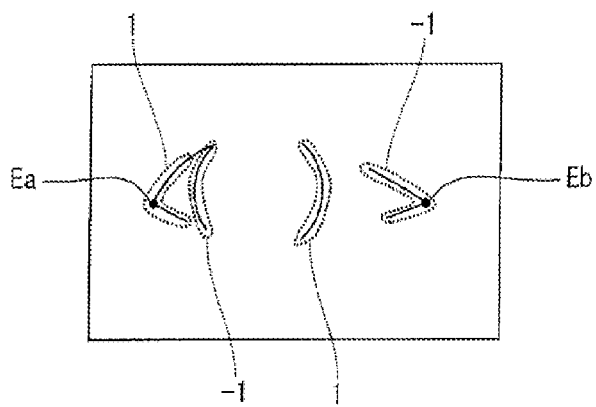
FIG. 4 is a view illustrating a first edge image having a ternarized luminance gradient value in a horizontal direction.

FIG. 4 is a view illustrating the first edge image having the ternarized luminance gradient value in the horizontal direction. Edges of boundaries between the upper eyelid and the lower eyelid, which extend in a crosswise direction, can be removed by ternarizing only the luminance gradient in the horizontal direction. That is, the boundaries between the pupil and a white of eye, which extend in the vertical direction, can mainly be detected. The value of the ternarized luminance gradient becomes $-1$ at the boundary on the left side of the pupil, and the value of the ternarized luminance gradient becomes 1 at the boundary on the right side of the pupil. Therefore, the left side and the right side of the pupil can be distinguished from each other. Because a skin region has a much smaller luminance than a region of the white of eye, the value of the ternarized luminance gradient at the position near the inner corner point of eye Ea becomes 1, and the value of the ternarized luminance gradient at the position near the tail point of eye Eb becomes $-1$.

Not the Sobel filter but another differentiation filter may be used as the differentiation filter. At this point, the differential value may be ternarized according to the luminance change in the direction from the inner corner of eye toward the tail of eye.

The first voting unit 33 performs voting with each pixel (the pixels having the values of −1 and 1) located at the edge of the first edge image as a voting execution pixel in order to detect the circle included in the first edge image by a Hough transform. At this point, the first voting unit 33 performs the voting while weighting a voting target according to the ternarized value.

Because the circle is detected, parameters of a Hough space that is of the voting target include a center coordinate (Xc, Yc) of the circle and a radius Rc of the circle. It is considered that the pupil region has a smaller luminance than the region of the white of eye. In the boundaries between the pupil and the white of eye, the ternarized value on the left side of the boundary always becomes −1, and the ternarized value on the right side of the boundary always becomes 1. That is, it is considered that the center coordinate (Xc, Yc) of the circle expressing the pupil is located on the right side of the many voting execution pixels in each of which the ternarized value is −1, and that the center coordinate (Xc, Yc) of the circle is located on the left side of the many voting execution pixels in each of which the ternarized value is 1.

When the ternarized value of the voting execution pixel of the first edge image is −1, the first voting unit 33 performs the voting while increasing a voting weight of the circle, which passes through the voting execution pixel and has the center coordinate on the right side of the x-coordinate of the voting execution pixel, and the first voting unit 33 performs the voting while decreasing the voting weight of the circle having the center coordinate on the left side. When the ternarized value of the voting execution pixel of the first edge image is 1, the first voting unit 33 performs the voting while decreasing the voting weight of the circle, which passes through the voting execution pixel and has the center coordinate on the right side of the x-coordinate of the voting execution pixel, and the first voting unit 33 performs the voting while increasing the voting weight of the circle having the center coordinate on the left side. For example, in the voting from the voting execution pixel having the ternarized value of −1, the voting is performed with the weight (the number of votes) of 1 with respect to the circle, which passes through the voting execution pixel and has the center on the left side of the voting execution pixel, and the voting is performed with the weight (the number of votes) of 2 with respect to the circle having the center on the right side of the voting execution pixel.

Based on a voting result performed by the first voting unit 33, the pupil outline identification unit 34 identifies a circle (Xc, Yc, Rc) obtaining the most votes as the circle expressing the pupil outline. The pupil outline identification unit 34 outputs the center coordinate (Xc, Yc) and the radius Rc of the identified circle to the pupil region identification unit 17.

Thus, the total number of votes of the circle considered to better express the pupil outline increases by performing the weighting in the voting according to the ternarized luminance gradient and the position of the voting target (the circle). For this reason, the circle for which a noise votes and the circle expressing the pupil outline can be distinguished from each other.

Assuming that the pupil is not the circle but an ellipse, the pupil outline detection unit 15 may detect the ellipse expressing the pupil outline by weighted voting. In this case, for example, the first voting unit 33 may change the voting weight with respect to the ellipse depending on which the right side or the left side of the voting execution pixel the center or two focuses of the ellipse exist. A general ellipse is expressed by five parameters, the coordinates of the two focuses and a sum of distances from the focuses.

<Configuration of Eyelid Outline Detection Unit>

The eyelid outline detection unit 16 acquires the eye image from the eye image extraction unit 14, and acquires the coordinates of the inner corner point of eye Ea and the tail point of eye Eb from the characteristic detection unit 13. The coordinates of the inner corner point of eye Ea and the tail point of eye Eb are correlated with the eye image. The eyelid outline detection unit 16 includes a second differentiation unit (differentiation unit) 41, a binarization unit (first edge extraction unit) 42, a second voting unit (curve identification unit) 43, and an eyelid outline identification unit (curve identification unit) 44.

The upper-eyelid outline and the lower-eyelid outline are separately detected. Although the case that the upper-eyelid outline is detected is described below, the lower-eyelid outline can similarly be detected.

The second differentiation unit 41 applies the differentiation filter to the eye image to obtain the luminance gradient. Unlike the first differentiation unit 31, the second differentiation unit 41 obtains the luminance gradient in the vertical and crosswise directions.

Specifically, the second differentiation unit 41 applies the differentiation filter (in this case, the Sobel filter) to the eye image in the y-direction and the x-direction to detect the absolute value of the luminance gradient as the edge intensity. FIG. 3(b) is a view illustrating the Sobel filter in the y-direction. The eye image or the Sobel filter may be applied while scaled as appropriate. The second differentiation unit 41 applies the Sobel filter in the y-direction and the Sobel filter in the x-direction to set the sum of the absolute value of the differential value in the y-direction and the absolute value of the differential value in the x-direction to the edge intensity at each position of the eye image.

The binarization unit 42 acquires the edge intensity (the absolute value of the differential value) corresponding to each position of the eye image from the second differentiation unit 41, binarizes the edge intensity of the eye image to extract the edge point, and generates a second edge image.

Specifically, the binarization unit 42 binarizes an absolute value dz of the differential value, which is obtained by applying the Sobel filter, by a threshold tc. Each position of the eye image is 0 for dz<tc, and is 1 for tc≤dz. The value of the second edge image is one of 0 and 1, the place (the edge point) having the large edge intensity becomes 1, and the place having the small edge intensity becomes 0.

Figure 5:
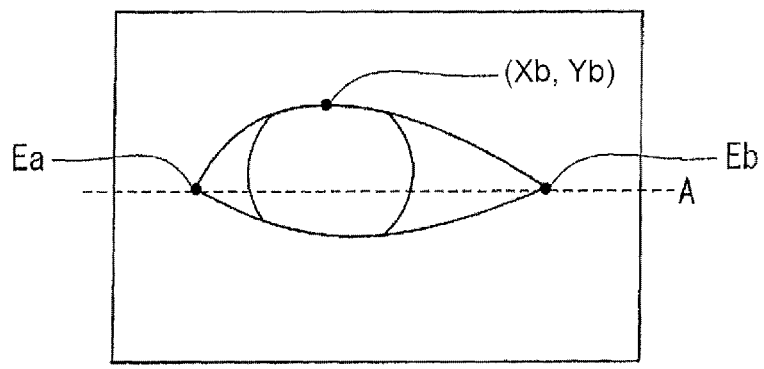
FIG. 5 is a view illustrating a second edge image having a binarized edge intensity.

FIG. 5 is a view illustrating the second edge image having the binarized edge intensity. The large-luminance-difference boundary (the eyelid outline) between the skin and the eye and the boundary (a pupil boundary) between the pupil and the white of eye are mainly extracted by the binarization. Not the Sobel filter but another differentiation filter may be used as the differentiation filter.

The second voting unit 43 performs the voting with each pixel (the pixel having the value of 1) located at the edge of the second edge image as the voting execution pixel in order to detect the curve expressing the eyelid outline by the Hough transform. In the case that the curve expressing the upper-eyelid outline is detected, because the lower-eyelid edge becomes the noise, the pixels located on the upper side (the upper side of a line A in FIG. 5) of the inner corner point of eye Ea and the tail point of eye Eb of the second edge image are set to the voting execution pixels.

In the first embodiment, the eyelid outline is expressed using a B-spline curve. A quadratic B-spline curve in one interval can be defined by two end points and one control point. The B-spline curve is convex toward the control point. In the B-spline curve, because the position where the curve becomes convex can be changed according to the position of the control point, the eyelid outline can accurately be expressed even if the face in the image faces slightly sideways. Because the inner corner point of eye Ea and the tail point of eye Eb, which are of the end points of the eyelid outline, are already-known, the coordinate (Xb, Yb) of the one control point may be obtained.

Specifically, the second voting unit 43 votes for the control point (Xb, Yb) of the B-spline curve passing through the voting execution pixel with respect to each voting execution pixel located on the upper sides of the inner corner point of eye Ea and the tail point of eye Eb of the second edge image. A range (a voting range in the Hough space) of the control point that becomes a voting target may be restricted to a predetermined range as needed basis. For the upper eyelid, it is considered that the control point is located on the upper sides of the inner corner point of eye Ea and the tail point of eye Eb.

Based on the voting result performed by the second voting unit 43, the eyelid outline identification unit 44 identifies the B-spline curve expressed by the control point (Xb, Yb) obtaining the most votes as the curve expressing the upper-eyelid outline. The identified B-spline curve is a curve that is expressed by the control point (Xb, Yb) with the inner corner point of eye Ea and the tail point of eye Eb as the end points of the interval. The eyelid outline identification unit 44 outputs the coordinates of the inner corner point of eye Ea and the tail point of eye Eb and the identified control point (Xb, Yb) to the pupil region identification unit 17.

Instead of the quadratic B-spline curve, the eyelid outline may be detected using curves, such as a higher-order B-spline curve and a Bezier curve, which are expressed by some control points and both the end points (the inner corner point of eye and the tail point of eye) through which the curve passes.

In the case that the eyelid outline is expressed by the curve expressed by the control point and the end points, both the end points (the inner corner point of eye and the tail point of eye) through which the curve passes are already-known by a conventional characteristic detection technology, only the coordinate of the remaining control point may be identified in order to detect the eyelid outline. Therefore, the control point can easily be obtained by the Hough transform. According to the curve (such as the B-spline curve) expressed by both the end points and the control point, various eyelid outlines can be expressed with high accuracy, and the eyelid outline can accurately be identified. Even if the quadratic B-spline curve having the one control point is used, various eyelid outlines can be expressed with high accuracy, and the two parameters (Xb, Yb) exist in the Hough space. Therefore, the calculation is easily performed compared with the case that the circle is detected.

Using a least square method and the like instead of the Hough transform, the B-spline curve fitting the binarized edge of the eye image can be obtained as the curve expressing the eyelid outline.

For the lower eyelid, like the upper eyelid, the voting is performed from each pixel of the edge located on the lower sides of the inner corner point of eye Ea and the tail point of eye Eb, and the control point of the B-spline curve expressing the lower-eyelid outline is identified. In the first embodiment, the voting is separately performed for the upper eyelid and the lower eyelid. Alternatively, the voting is collectively performed from all the upper and lower edges of the eye image, and the upper and lower curves having the large numbers of votes may be identified as the curve expressing the upper eyelid and the curve expressing the lower eyelid.

<Image Processing Flow>

Figure 6:
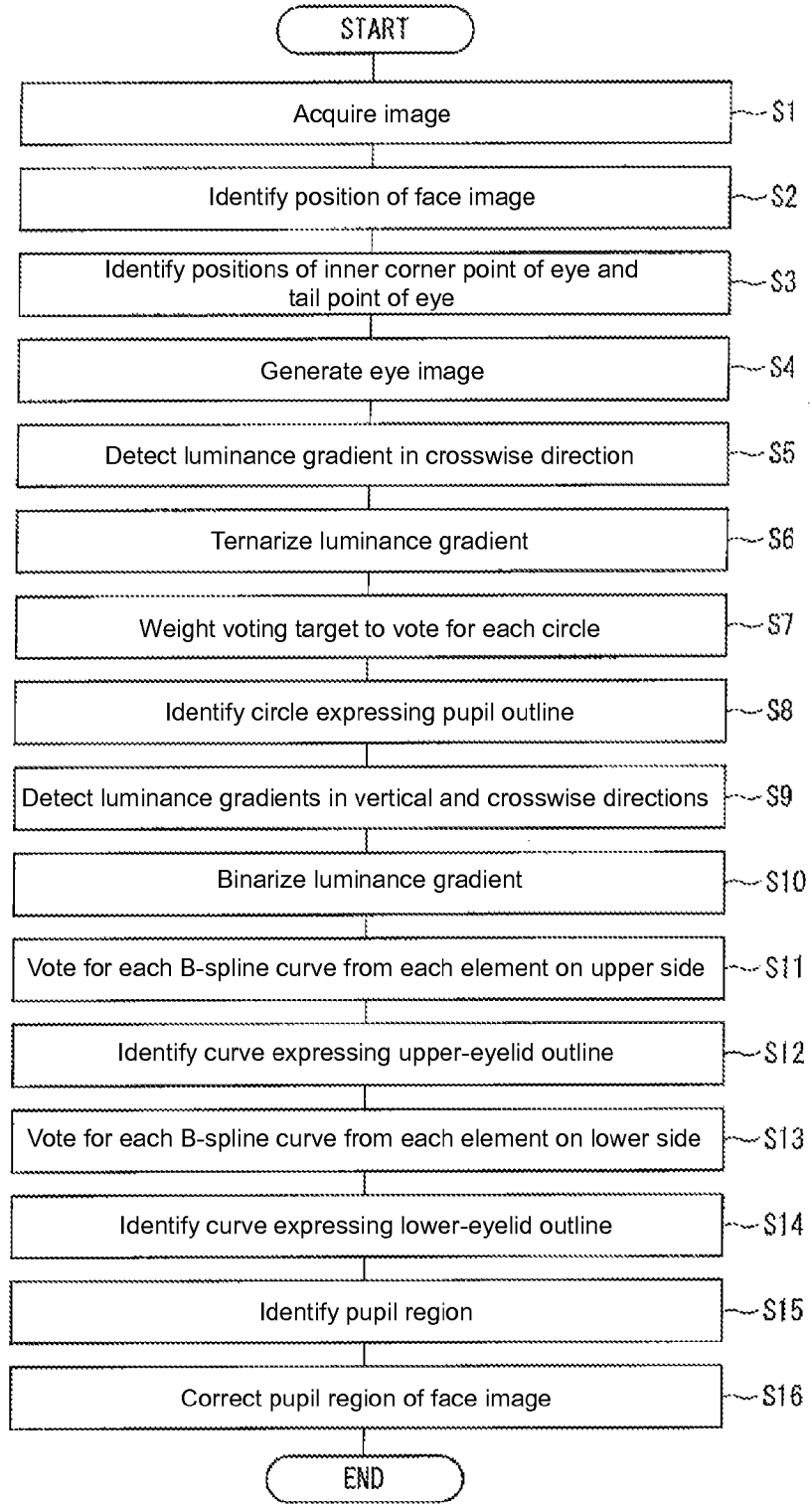
FIG. 6 is a flowchart illustrating a flow of image correction processing in an image processing device of the digital camera.

A flow of image correction processing in the image processing device 6 will be described below. FIG. 6 is a flowchart illustrating the flow of the image correction processing in the image processing device 6. At this point, the case that the processing is performed to the detected one eye is described for the sake of convenience.

The image acquisition unit 11 receives the captured image from the imaging device 3 (S1).

The face detection unit 12 detects the processing target face image included in the image, and identifies the position of the face image (S2).

The characteristic detection unit 13 detects the positions of the inner corner point of eye and the tail point of eye, which are included in the detected face image (S3).

The eye image extraction unit 14 extracts the image in the predetermined region including the eye of the processing target face image, and generates the eye image shown in FIG. 2 (S4). At this point, the image is rotated as needed basis such that the positional relationship between the tail point of eye and the inner corner point of eye becomes horizontal.

The first differentiation unit 31 applies a differentiation filter, which is used to perform the differentiation in the x-direction, to the eye image to detect the luminance gradient in the horizontal direction of the eye (S5).

The ternarization unit 32 ternarizes the luminance gradient of the eye image (S6). Therefore, the luminance gradient can be ternarized into the values of −1, 0, and 1 according to a light-dark change in the horizontal direction (the crosswise direction) of the eye image. FIG. 4 is a view illustrating the ternarized first edge image.

In order to detect the circle by the Hough transform, the first voting unit 33 weights the voting target according to the ternarized value to perform the voting with each pixel (the pixels having the values of −1 and 1) located at the edge of the first edge image as the voting execution pixel (S7).

Based on the voting result performed by the first voting unit 33, the pupil outline identification unit 34 identifies the circle (Xc, Yc, Rc) obtaining the most votes as the circle expressing the pupil outline (S8).

The second differentiation unit 41 applies the differentiation filter to the eye image to detect the luminance gradients in the vertical and crosswise directions (S9).

The binarization unit 42 binarizes the luminance gradient of the eye image according to the edge intensity (S10). FIG. 5 is a view illustrating the binarized second edge image.

The second voting unit 43 performs the voting with each pixel (the pixel having the value of 1) corresponding to the edge located on the upper side of the second edge image as the voting execution pixel in order to detect the B-spline curve by the Hough transform (S11).

Based on the voting result performed by the second voting unit 43, the eyelid outline identification unit 44 identifies the B-spline curve expressed by the control point (Xb1, Yb1) obtaining the most votes as the curve expressing the upper-eyelid outline (S12).

The second voting unit 43 performs the voting with each pixel (the pixel having the value of 1) corresponding to the edge located on the lower side of the second edge image as the voting execution pixel in order to detect the B-spline curve by the Hough transform (S13).

Based on the voting result performed by the second voting unit 43, the eyelid outline identification unit 44 identifies the B-spline curve expressed by the control point (Xb2, Yb2) obtaining the most votes as the curve expressing the lower-eyelid outline (S14).

Figure 7:
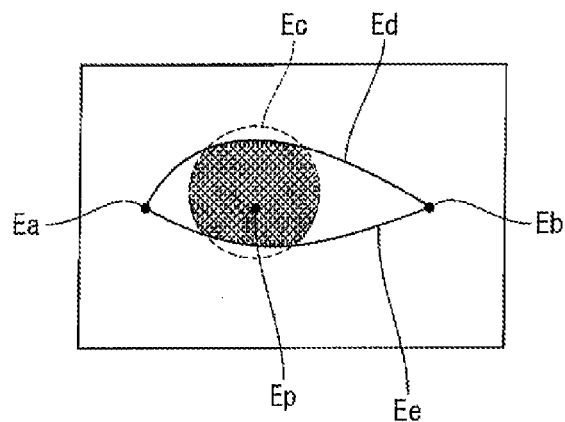
FIG. 7 is a view illustrating a circle expressing an identified pupil outline and a curve expressing an identified eyelid outline.

FIG. 7 is a view illustrating the circle expressing the identified pupil outline and the curve expressing the identified eyelid outline. In FIG. 7, a circle Ec expressing the pupil outline is indicated by a broken line, and a curve Ed expressing the upper-eyelid outline and a curve Ee expressing the lower-eyelid outline are indicated by solid lines.

The pupil region identification unit 17 identifies the region, which is located in the circle Ec expressing the pupil outline, located on the lower side of the curve Ed expressing the upper-eyelid outline, and located on the upper side of the curve Ee expressing the lower-eyelid outline, as a pupil region Ep (S15).

The image correction unit 18 corrects the pupil color in the pupil region of the face image (S16).

The image processing device 6 outputs the corrected image to the image storage device 4 or the display device 5 to end the processing.

In the first embodiment, as described above, the luminance change (the decrease, no change, and the increase) is ternarized in the x-direction (the direction in which the inner corner of eye and the tail of eye are substantially lined) of the eye image, and the voting is performed while the voting target (the circle) is weighted by the Hough transform according to the luminance change in the x-direction. Therefore, the noises such as the eyelid outline can be eliminated. The outline on the left side of the pupil and the outline on the right side of the pupil are distinguished from each other by the ternarization, and the voting is performed while the weight of the voting target is changed according to the distinction. Therefore, the number of votes of the circle considered to better express the pupil outline can be increased. Therefore, the circle expressing the pupil outline can accurately be identified. Thus, the prior knowledge that the pupil of the detection target in the image has the luminance smaller than that of the surrounding white of eye can be incorporated in the detection processing by the ternarization and the corresponding weighting. Therefore, the pupil outline can accurately be detected compared with the conventional detection of the general circular shape by the Hough transform.

In the case that a red eye is generated in the captured image, a red eye region having the large luminance exists in the pupil of the eye image. For example, in the boundary of the red eye region having the large luminance in the pupil having the small luminance, the left side becomes 1 while the right side becomes −1 through the ternarization, and the values of the left side and the right side become opposite to those of the boundary of the pupil. The weight of the boundary (the value of 1) on the left side of the red eye region increases with respect to the circle in which the center is located on the left side of the boundary, and the weight of the boundary (the value of −1) on the right side of the red eye region increases with respect to the circle in which the center is located on the right side of the boundary. Therefore, the voting weight of the boundary of the red eye region that is of the noise is dispersed in different regions. For this reason, the false detection of the red eye region as the pupil region can be prevented. Thus, an influence of the noise on the edge point can be reduced in the Hough transform by performing the weighting in the ternarization.

The upper-eyelid and lower-eyelid outlines, which possibly vary depending on the orientation of the face and individual differences, are expressed by the curve (such as the B-spline curve) expressed by the control point and both the end points. In the B-spline curve and the like, the orientation and the position of the convexity of the curve can be adjusted by the coordinate of the control point, so that the eyelid outline that is of various shapes can accurately be expressed. Because the inner corner point of eye and the tail point of eye can easily be acquired by a well-known technology, both the end points are already known. Therefore, based on the edge of the eye image, the remaining control point can easily be identified using the Hough transform.

The pupil region partially hidden behind the eyelid in the image can be identified with high accuracy based on the circle expressing the identified pupil outline and the curve expressing the eyelid outline. Therefore, the pupil region can accurately be corrected. The eye and the like can be corrected based on the accurately-identified pupil region.

Because the pupil region and the pupil center can accurately be detected, the pupil of the person is detected from the still image or the moving image, and the information on the pupil can be applied to various technologies. For example, the image processing device of the first embodiment can be applied to an auto shutter function of estimating a sight line of a subject (particularly an infant) from the detected pupil and automatically releasing a shutter when the sight line is oriented toward the camera, and an in-vehicle driving system that estimates a driving state (such as looking aside while driving) of a driver from the detected pupil to issue a warning.

[Second Embodiment]

A configuration in which the differentiation is performed only in the vertical direction (the y-direction) in the eyelid detection is described in a second embodiment. For the sake of convenience, the component and the configuration which are the same as those of the first embodiment are designated by the same signs, and the detailed description is omitted. The second embodiment of the present invention will be described below with reference to the drawings.

A configuration of a digital camera of the second embodiment is similar to that of the digital camera 1 of the first embodiment in FIG. 1. The second embodiment differs from the first embodiment only in the processing of each unit of the eyelid outline detection unit 16.

The second differentiation unit 41 applies the differentiation filter to the eye image to obtain the luminance gradient in the vertical direction. In the second embodiment, unlike the first embodiment, the second differentiation unit 41 obtains not the luminance gradient in the crosswise direction (the horizontal direction), but the luminance gradient in the vertical direction.

Specifically, the second differentiation unit 41 applies the differentiation filter (in this case, the Sobel filter) to the eye image in the y-direction to obtain the absolute value of the luminance gradient in the vertical direction as the edge intensity. The second differentiation unit 41 applies the Sobel filter in the y-direction to set the absolute value of the differential value in the y-direction to the edge intensity at each position of the eye image.

The binarization unit 42 acquires the edge intensity (the absolute value of the differential value) corresponding to each position of the eye image from the second differentiation unit 41, and generates a third edge image in which the edge intensity of the eye image is binarized.

Specifically, the binarization unit 42 binarizes an absolute value dy of the differential value, which is obtained by applying the Sobel filter, by a threshold td. Each position of the eye image is 0 for $dy < td$, and is 1 for $td \leq dy$. The value of the third edge image is one of 0 and 1, the place having the large edge intensity becomes 1, and the place having the small edge intensity becomes 0.

Figure 8:
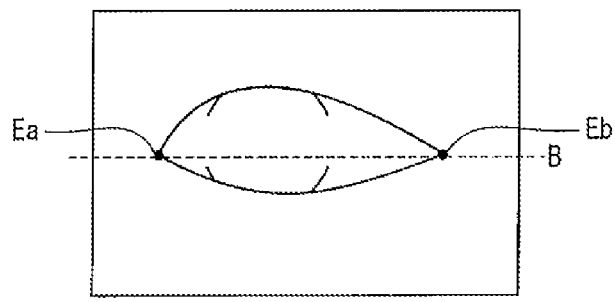
FIG. 8 is a view illustrating a third edge image having a binarized edge intensity in a vertical direction.

FIG. 8 is a view illustrating the third edge image having the binarized edge intensity in the vertical direction. The edge of the boundary of the pupil and the white of eye, which extends in the vertical direction, can partially be removed by binarizing the edge intensity in the vertical direction. That is, the boundaries of the eyelid and the white of eye or the pupil, which extend in the crosswise direction, can mainly be extracted.

The second voting unit 43 performs the voting with each pixel (the pixel having the value of 1) located at the edge of the third edge image as the voting execution pixel in order to detect the curve (the B-spline curve) expressing the eyelid outline by the Hough transform. In the case that the curve expressing the upper-eyelid outline is detected, because the lower-eyelid edge becomes the noise, the pixels located on the upper side (the upper side of a line B in FIG. 8) of the inner corner point of eye Ea and the tail point of eye Eb of the third edge image are set to the voting execution pixels.

Based on the voting result performed by the second voting unit 43, the eyelid outline identification unit 44 identifies the B-spline curve expressed by the control point obtaining the most votes as the curve expressing the upper-eyelid outline.

According to the second embodiment, part of the edge of the pupil outline, which becomes the noise in detecting the eyelid outline, can be removed. The curve expressing the eyelid outline can more accurately be identified, and the pupil region can be identified with high accuracy using the identified curve.

The absolute value of the differential value is not binarized, but the differential value that possibly takes positive and negative values according to the luminance gradient may be binarized using the threshold. For example, in the case that a luminance relationship becomes "pupil<skin (eyelid)<white of eye", it is considered that the positive and negative signs of the differential value become reverse at the boundary between the upper eyelid and the pupil and the boundary between the upper eyelid and the white of eye in the upper-eyelid outline. For this reason, only the edge of the boundary between the upper eyelid and the pupil can be left by the binarization. In order to identify the pupil region with high accuracy, the boundary between the pupil and the eyelid is accurately detected, but the boundary between the white of eye and the eyelid may not be identified. Therefore, the pupil region can be identified with high accuracy by obtaining the B-spline curve fitting only to the edge of the boundary between the upper eyelid and the pupil. In this case, the upper sides and the lower sides of the inner corner point of eye Ea and the tail point of eye Eb are separately binarized using different thresholds.

[Modifications]

An image processing device according to at least one embodiment of the present invention for identifying a characteristic of an eye from a face image of a person, the image processing device includes: a first differentiation unit that differentiates an eye region where the eye of the face image exists in at least a vertical direction of the eye to obtain a first luminance gradient; a first edge extraction unit that extracts a first edge point in the eye region according to the first luminance gradient; and a curve identification unit that identifies a curve, which is expressed by a control point and both end points and fits to the first edge point, as a curve expressing an upper-eyelid or lower-eyelid outline, the end points being an inner corner point of eye and a tail point of eye, wherein the curve expressed by both the end points and the control point is a B-spline curve or a Bezier curve, wherein the curve identification unit is configured to vote for the control point that is a voting target with respect to the first edge point using the Hough transform, and identify the B-spline curve or the Bezier curve expressed by both the end points and at least one of the control point, which fits to the first edge point, as the curve expressing the upper-eyelid or lower-eyelid outline based on the voting result.

An image processing method according to at least one embodiment of the present invention for identifying a characteristic of an eye from a face image of a person, the image processing method includes: a first differentiation step of differentiating an eye region where the eye of the face image exists in at least a vertical direction of the eye to obtain a first luminance gradient; a first edge extraction step of extracting a first edge point in the eye region according to the first luminance gradient; and a curve identification step of identifying a curve, which is expressed by a control point and both end points and fits to the first edge point, as a curve expressing an upper-eyelid or lower-eyelid outline, the end points being an inner corner point of eye and a tail point of eye, wherein the curve expressed by both the end points and the control point is a B-spline curve or a Bezier curve, wherein the curve identification unit is configured to vote for the control point that is a voting target with respect to the first edge point using the Hough transform, and identify the B-spline curve or the Bezier curve expressed by both the end points and at least one of the control point, which fits to the first edge point, as the curve expressing the upper-eyelid or lower-eyelid outline based on the voting result.

At this point, the curve expressed by both the end points and the control point passes through both the end points, and the position and the orientation of the convexity of the curve is defined by the control point between both the end points. For example, the curve expressed by both the end points and the control point is a B-spline curve or a Bezier curve. At this point, for example, the B-spline curve or the Bezier curve may be a quadratic B-spline curve, a higher-order B-spline curve, a cubic Bezier curve, or a higher-order Bezier curve.

According to the configuration, the first edge point is extracted from the first luminance gradient that is differentiated in at least the vertical direction of the eye. Because the upper-eyelid and lower-eyelid outlines extend mainly in the crosswise direction, the main edge points corresponding to the upper-eyelid and lower-eyelid outlines are included in the first edge point. The eyelid outlines having various shapes can be expressed using the curves, such as the B-spline curve, which are expressed by both the end points and the control point. For example, in the image in which the face is not oriented toward the front, the convex portion of the upper eyelid deviates onto the side of the inner corner of eye or the tail of eye. In the curve expressed by both the end points and the control point, the eyelid outline can properly and easily be expressed by the control point. The inner corner point of eye and the tail point of eye, which are of both the end points of the curve, can easily be identified by a well-known technology. Therefore, the curve identification unit can identify the curve expressing the eyelid outline only by identifying the remaining control point based on the first edge point. In the face image, the pupil region partially hidden behind the eyelid can be identified using the accurately-identified curve expressing the eyelid outline.

The eyelid outlines having various shapes can properly and easily be expressed according to the position of the control point using the curve expressed by both the end points and the control point. Because the inner corner point of eye and the tail point of eye are already known, the curve expressing the eyelid outline can be identified only by identifying the remaining control point based on the first edge point. In the face image, the pupil region partially hidden behind the eyelid can be identified using the accurately-identified curve expressing the eyelid outline.

The curve identification unit may vote for the control point that is a voting target with respect to the first edge point using the Hough transform, and identify the B-spline curve expressed by both the end points and the one control point, which fits to the first edge point, as the curve expressing the upper-eyelid or lower-eyelid outline based on the voting result.

Even in the B-spline curve having only one control point, the convex position and height of the curve can be changed in various ways according to the position of the control point. According to the configuration, the eyelid outline can properly be expressed by the B-spline curve having the one control point, and the eyelid outline can easily be obtained by the Hough transform because only the coordinate of the control point having one unknown variable is left.

The curve identification unit may identify the curve expressing the upper-eyelid outline from the first edge point located on an upper side of a line connecting the inner corner point of eye and the tail point of eye, and identify the curve expressing the lower-eyelid outline from the first edge point located on a lower side of the line connecting the inner corner point of eye and the tail point of eye.

It is considered that the first edge point corresponding to the upper-eyelid outline is located on the upper side of the line connecting the inner corner point of eye and the tail point of eye. It is considered that the first edge point corresponding to the lower-eyelid outline is located on the lower side of the line connecting the inner corner point of eye and the tail point of eye. Therefore, according to the configuration, the edge point that becomes the noise irrespective of the upper eyelid and the lower eyelid can be removed. Therefore, the curve expressing the upper-eyelid outline and the curve expressing the lower-eyelid outline can more accurately be identified.

The first differentiation unit may obtain the first luminance gradient by differentiating the eye region along the vertical direction of the eye, and the first edge extraction unit may extract a point at which an absolute value of the first luminance gradient is greater than a first threshold as the first edge point.

According to the configuration, the edge of the boundary of the pupil and the white of eye, which becomes the noise and extends in the vertical direction, can partially be removed. Therefore, the curve expressing the upper-eyelid outline and the curve expressing the lower-eyelid outline can more accurately be identified.

The image processing device may further include: a second differentiation unit that obtains a second luminance gradient by differentiating the eye region in a crosswise direction of the eye; a second edge extraction unit that extracts a second edge point corresponding to a boundary at which a left side is brighter than a right side and a third edge point corresponding to a boundary at which the left side is darker than the right side as edge points with respect to the eye region according to the second luminance gradient; a voting unit that votes for an ellipse that is a voting target at each of the second and third edge points using a Hough transform while changing a weight of the voting with respect to the ellipse according to one of the second edge point and the third edge point and according to a positional relationship between the ellipse and the edge point; and a pupil outline identification unit that identifies an ellipse expressing a pupil outline based on a voting result of the voting unit.

According to the configuration, the second edge point corresponding to the boundary at which the left side is brighter than the right side and the third edge point corresponding to the boundary at which the left side is darker than the right side are extracted as the edge points from the second luminance gradient differentiated in the crosswise direction of the eye. Therefore, the outline extending in the vertical direction of the eye is extracted as the edge point, and the outline extending in the crosswise direction is eliminated. Consequently, the edges, such as the eyelid outline, which become the noise in identifying the ellipse expressing the pupil outline, can be eliminated.

Because the luminance of the pupil region is considered to be lower than that of the surrounding white of eye region, the second edge point corresponding to the boundary at which the left side is brighter than the right side is considered to correspond to the outline on the left side of the pupil, and the third edge point corresponding to the boundary at which the left side is darker than the right side is considered to correspond to the outline on the right side of the pupil. That is, it is considered that the center of the ellipse expressing the pupil outline is located on the right sides of many second edge points and the left sides of many third edge points. Therefore, in the Hough transform, according to one of the second edge point and the third edge point, and according to the positional relationship between the ellipse that is the voting target and the edge point, the voting is performed while the voting weight is changed with respect to the ellipse, which allows the ellipse expressing the pupil outline to be accurately identified. The pupil region can be identified using the accurately-identified ellipse expressing the pupil outline.

In the case that the red eye is generated in the photograph image, it is considered that the luminance of the red eye region is larger than that of the surrounding pupil region. Therefore, the positions of the right and left edges of the outline in the red eye region are opposite to those of the right and left edges of the pupil outline. For this reason, the voting from the red eye region is dispersed by the weighted voting. Consequently, the false detection of the outline of the red eye region as the pupil outline can be prevented.

The pupil outline may be regarded as the circle to identify the circle expressing the pupil outline.

The curve identification unit may identify the curve fitting to the first edge point located on the upper side of the inner corner point of eye or the tail point of eye as the curve expressing the upper-eyelid outline, and identify the curve fitting to the first edge point located on the lower side of the inner corner point of eye or the tail point of eye as the curve expressing the lower-eyelid outline, and the image processing device may further include a pupil region identification unit that identifies a pupil region of the face image based on the ellipse expressing the pupil outline, the curve expressing the upper-eyelid outline, and the curve expressing the lower-eyelid outline.

According to the configuration, the curve expressing the upper-eyelid outline, the curve expressing the lower-eyelid outline, and the ellipse expressing the pupil outline can accurately be identified. It is considered that the region on the inside of the ellipse expressing the pupil outline, the lower side of the curve expressing the upper-eyelid outline, and the upper side of the curve expressing the lower-eyelid outline is the pupil region in the face image. Therefore, the pupil region can accurately be identified.

The voting unit may perform the voting from the second edge point while a weight of the ellipse in which a center coordinate is located on the right side of the second edge point is larger than a weight of the ellipse in which a center coordinate is located on the left side of the second edge point, and the voting unit may perform the voting from the third edge point while the weight of the ellipse in which the center coordinate is located on the left side of the third edge point is larger than the weight of the ellipse in which the center coordinate is located on the right side of the third edge point.

According to the configuration, from the second edge point likely to be the outline on the left side of the pupil, the voting is performed for the ellipse, which has the center coordinate on the right side of the second edge point and is considered to fit to the pupil outline, with the large weight and the voting is performed for the ellipse, which has the center coordinate on the left side of the second edge point and is considered not to fit to the pupil outline, with the small weight. According to the configuration, from the third edge point likely to be the outline on the right side of the pupil, the voting is performed for the ellipse, which has the center coordinate on the left side of the third edge point and is considered to fit to the pupil outline, with the large weight and the voting is performed for the ellipse, which has the center coordinate on the right side of the third edge point and is considered not to fit to the pupil outline, with the small weight. Therefore, the voting for the ellipse fitting to the pupil outline can be increased. Therefore, the ellipse expressing the pupil outline can accurately be identified.

The second differentiation unit may obtain the second luminance gradient by differentiating the eye region along a direction in which an inner corner of eye and a tail of eye are lined, and the second edge extraction unit may ternarize the second luminance gradient using a positive second threshold and a negative third threshold, and extracts the second edge point and the third edge point according to the ternarized second luminance gradient.

According to the configuration, the second differentiation unit differentiates the eye region along the direction in which the inner corner of eye and the tail of eye are lined, so that the edges of the eyelid outline and the like, which become the noise and extend mainly in the crosswise direction, can be eliminated.

(Program and Recording Medium)

The image processing device may partially be constructed by a computer. In this case, at least one embodiment of the present invention also includes a control program that implements the image processing device by causing a computer to operate as each unit of the image processing device and a computer-readable recording medium in which the control program is recorded.

Each block of the image processing device 6, particularly the image acquisition unit 11, the face detection unit 12, the characteristic detection unit 13, the eye image extraction unit 14, the pupil outline detection unit 15, the eyelid outline detection unit 16, the pupil region identification unit 17, the image correction unit 18, the output unit 19, the first differentiation unit 31, the ternarization unit 32, the first voting unit 33, the pupil outline identification unit 34, the second differentiation unit 41, the binarization unit 42, the second voting unit 43, and the eyelid outline identification unit 44 may be constructed by a hardware logic, or by software using a CPU (Central Processing Unit) as described below.

That is, the image processing device 6 includes the CPU that executes a command of a control program implementing each of the above units, a ROM (Read Only Memory) in which the control program is stored, a RAM (Random Access Memory) in which the control program is expanded, and storage devices (recording mediums), such as a memory, in which the control program and various pieces of data are stored. The object of the present invention can also be achieved such that the recording medium in which a program code (an executable format program, an intermediate code program, a source program) of the control program for the image processing device 6, which is of the software implementing the above units, is stored while being readable by a computer is supplied to the image processing device 6, and such that the computer (or the CPU or an MPU (Microprocessor Unit)) reads and executes the program code recorded in the recording medium.

Examples of the recording medium include tape systems, such as a magnetic tape and a cassette tape, disk systems including magnetic disks, such as a floppy (registered trademark) disk and a hard disk, and optical disks, such as a CD-ROM (Compact Disc Read-Only Memory), an MO (Magneto-Optical), an MD (Mini Disc), a DVD (Digital Versatile Disk), and a CD-R (CD Recordable), card systems, such as an IC card (including a memory card) and an optical card, and semiconductor memory systems, such as a mask ROM, an EPROM (Erasable Programmable Read-Only Memory), an EEPROM (Electrically Erasable and Programmable Read-Only Memory) and a flash ROM.

The image processing device 6 may be configured to be able to be connected to a communication network, and the program code may be supplied through the communication network. There is no particular limitation to the communication network. Examples of the communication network include the Internet, an intranet, an extranet, a LAN (Local Area Network), an ISDN (Integrated Services Digital Network), a VAN (Value-Added Network), a CATV (Community Antenna Television) communication network, a virtual private network, a telephone line network, a mobile communication network, and a satellite communication network. There is no particular limitation to a transmission medium constituting the communication network. Examples of the transmission medium include wired lines, such as IEEE (Institute of Electrical and Electronic Engineers) 1394, a USB, a power-line carrier, a cable TV line, a telephone line, and an ADSL (Asynchronous Digital Subscriber Loop) line, and wireless lines, such as infrared rays, such as IrDA (Infrared Data Association) and a remote controller, Bluetooth (registered trademark), 802.11 wireless, HDR (High Data Rate), a mobile phone network, a satellite line, and a terrestrial digital network.

The present invention is not limited to the embodiments, but various changes can be made without departing from the scope of the present invention. That is, an embodiment obtained by a combination of technical means, which are properly changed without departing from the scope of the present invention, is also included in the technical scope of the present invention.

INDUSTRIAL APPLICABILITY

The present invention can be applied to the digital camera provided with the image processing device and the like.

The invention claimed is:

1. An image processing device for identifying a characteristic of an eye from a face image of a person, the image processing device comprising:
  a first differentiation unit configured to differentiate an eye region where the eye of the face image exists in at least a vertical direction of the eye to obtain a first luminance gradient;
  a first edge extraction unit configured to extract a first edge point in the eye region according to the first luminance gradient;
  a curve identification unit configured to identify a curve, which is expressed by a control point and two end points and which fits to the first edge point, as a curve expressing an upper-eyelid or lower-eyelid outline, the end points being an inner corner point of the eye and a tail point of the eye,
wherein the curve expressed by the end points and the control point is a B-spline curve or a Bezier curve,
wherein the curve identification unit is configured to vote for a control point that is a voting target with respect to the first edge point using a Hough transform, and identify the B-spline curve or the Bezier curve expressed by the end points and at least one control point, which fits to the first edge point, as the curve expressing the upper-eyelid or lower-eyelid outline based on a result of the voting,
a second differentiation unit configured to obtain a second luminance gradient by differentiating the eve region in a crosswise direction of the eye;
a second edge extraction unit configured to extract a second edge point corresponding to a boundary at which a left side is brighter than a right side and a third edge point corresponding to a boundary at which the left side is darker than the right side as edge points with respect to the eye region according to the second luminance gradient;
a voting unit configured to vote for an ellipse that is a voting target at each of the second and third edge points using a Hough transform while changing a weight of the voting with respect to the ellipse according to one of the second edge point and the third edge point and according to a positional relationship between the ellipse and the edge point; and
a pupil outline identification unit configured to identify an ellipse expressing a pupil outline based on a voting result of the voting unit.

2. The image processing device according to claim 1, wherein the curve identification unit is configured to vote for the control point that is a voting target with respect to the first edge point using the Hough transform, and identify the B-spline curve expressed by the end points and the at least one control point, which fits to the first edge point, as the curve expressing the upper-eyelid or lower-eyelid outline based on the result of the voting.

3. The image processing device according to claim 1, wherein the curve identification unit is configured to identify the curve expressing the upper-eyelid outline from the first edge point located on an upper side of a line connecting the inner corner point of the eye and the tail point of the eye, and identify the curve expressing the lower-eyelid outline from the first edge point located on a lower side of the line connecting the inner corner point of the eye and the tail point of the eye.

4. The image processing device according to claim 1, wherein the first differentiation unit is configured to obtain the first luminance gradient by differentiating the eye region along the vertical direction of the eye, and
the first edge extraction unit is configured to extract a point at which an absolute value of the first luminance gradient is greater than a first threshold as the first edge point.

5. The image processing device according to claim 1, wherein the voting target of the voting unit is a circle, and
the pupil outline identification unit is configured to identify a circle expressing the pupil outline based on the voting result of the voting unit.

6. The image processing device according to claim 1, wherein the curve identification unit is configured to identify the curve fitting to the first edge point located on the upper side of the inner corner point of the eye or the tail point of the eye as the curve expressing the upper-eyelid outline, and identify the curve fitting to the first edge point located on the lower side of the inner corner point of the eye or the tail point of the eye as the curve expressing the lower-eyelid outline, and
the image processing device further comprises a pupil region identification unit configured to identify a pupil region of the face image based on the ellipse expressing the pupil outline, the curve expressing the upper-eyelid outline, and the curve expressing the lower-eyelid outline.

7. The image processing device according to claim 1, wherein the voting unit is configured to perform the voting from the second edge point while a weight of the ellipse in which a center coordinate is located on the right side of the second edge point is larger than a weight of the ellipse in which a center coordinate is located on the left side of the second edge point, and
the voting unit is configured to perform the voting from the third edge point while the weight of the ellipse in which the center coordinate is located on the left side of the third edge point is larger than the weight of the ellipse in which the center coordinate is located on the right side of the third edge point.

8. The image processing device according to claim 1, wherein the second differentiation unit is configured to obtain the second luminance gradient by differentiating the eye region along a direction in which the inner corner of the eye and the tail of the eye are lined, and
the second edge extraction unit is configured to ternarize the second luminance gradient using a positive second threshold and a negative third threshold, and extract the second edge point and the third edge point according to the ternarized second luminance gradient.

9. An image processing method for identifying a characteristic of an eye from a face image of a person, the image processing method comprising:
a first differentiation step of differentiating an eye region where the eye of the face image exists in at least a vertical direction of the eye to obtain a first luminance gradient;
a first edge extraction step of extracting a first edge point in the eye region according to the first luminance gradient;
a curve identification step of identifying a curve, which is expressed by a control point and two end points and which fits to the first edge point, as a curve expressing an upper-eyelid or lower-eyelid outline, the end points being an inner corner point of the eye and a tail point of the eye,
wherein the curve expressed by the end points and the control point is a B-spline curve or a Bezier curve,
wherein the curve identification step includes voting for a control point that is a voting target with respect to the first edge point using a Hough transform, and identifying the B-spline curve or the Bezier curve expressed by the end points and at least one control point, which fits to the first edge point, as the curve expressing the upper-eyelid or lower-eyelid outline based on a result of the voting,
a second differentiation step of obtaining a second luminance gradient by differentiating the eye region in a crosswise direction of the eye:
a second edge extraction step of extracting a second edge point corresponding to a boundary at which a left side is brighter than a right side and a third edge point corresponding to a boundary at which the left side is darker than the right side as edge points with respect to the eye region according to the second luminance gradient:

a voting step of voting for an ellipse that is a voting target of each of the second and third edge points using a Hough transform while changing a weight of the voting with respect to the ellipse according to one of the second edge point and the third edge point and according to a positional relationship between the ellipse and the edge point; and a pupil outline identification step of identifying an ellipse expressing a pupil outline based on a voting result of the voting unit.

* * * * *